(12) United States Patent
Varnoux et al.

(10) Patent No.: US 10,087,991 B2
(45) Date of Patent: Oct. 2, 2018

(54) BALL BEARING COMPRISING A CAGE PROVIDED WITH A WIRE AND A SEAL

(71) Applicants: Laurent Varnoux, Saint Avertin (FR); Bruno Constant, Tours (FR); Olivier Verbe, Tours (FR)

(72) Inventors: Laurent Varnoux, Saint Avertin (FR); Bruno Constant, Tours (FR); Olivier Verbe, Tours (FR)

(73) Assignee: AKTIEBOLAGET, Gothenburg (SE)

( * ) Notice: Subject to any disclaimer, the term of this patent is extended or adjusted under 35 U.S.C. 154(b) by 43 days.

(21) Appl. No.: 15/277,233

(22) Filed: Sep. 27, 2016

(65) Prior Publication Data

US 2017/0089395 A1 Mar. 30, 2017

(30) Foreign Application Priority Data

Sep. 30, 2015 (FR) ...................... 15 59254

(51) Int. Cl.
*F16C 33/78* (2006.01)
*F16C 33/38* (2006.01)
*F16C 33/41* (2006.01)
*F16C 19/06* (2006.01)
*F16C 33/42* (2006.01)

(52) U.S. Cl.
CPC ...... *F16C 33/7893* (2013.01); *F16C 33/3831* (2013.01); *F16C 33/41* (2013.01); *F16C 33/7806* (2013.01); *F16C 33/7823* (2013.01); *F16C 19/06* (2013.01); *F16C 33/42* (2013.01); *F16C 2226/74* (2013.01)

(58) Field of Classification Search
CPC .. F16C 33/3831; F16C 33/42; F16C 33/4611; F16C 33/54; F16C 33/7806; F16C 33/7823; F16C 33/783; F16C 33/7893
See application file for complete search history.

(56) References Cited

U.S. PATENT DOCUMENTS

| | | | |
|---|---|---|---|
| 466,439 A | 1/1892 | Simonds | |
| 2010/0308594 A1* | 12/2010 | Numajiri | F16C 19/38 290/55 |
| 2015/0176652 A1* | 6/2015 | Back | F16C 33/7806 384/484 |

FOREIGN PATENT DOCUMENTS

| | | | |
|---|---|---|---|
| AT | 382217 B | 1/1987 | |
| DE | 2749118 A1 | 5/1979 | |
| DE | 4322761 A1 | 1/1995 | |
| DE | 19813587 A1 | 9/1999 | |
| FR | 2655099 A1 | 5/1991 | |
| GB | 1515643 A | 6/1978 | |
| JP | 2014-119029 | * 12/2012 | |
| WO | WO-2016096428 A1 * | 6/2016 | ......... F16C 33/7893 |
| WO | WO-2016096430 A1 * | 6/2016 | ......... F16C 33/7893 |

* cited by examiner

*Primary Examiner* — James Pilkington
(74) *Attorney, Agent, or Firm* — Bryan Peckjian; SFK USA Inc. Patent Dept.

(57) ABSTRACT

A ball bearing that provides an inner race, an outer race, at least one row of balls and at least one cage for spacing apart the row of balls and having a wire extending inside a rolling space delimited by the outer race and the inner race. The bearing also provides at least one seal that includes coupling means for fastening to the wire of the cage.

7 Claims, 4 Drawing Sheets

BALL BEARING COMPRISING A CAGE PROVIDED WITH A WIRE AND A SEAL

CROSS REFERENCE TO RELATED APPLICATIONS

This application claims priority to French patent application no. 1559254 filed on Oct. 30, 2015, the contents of which are fully incorporated herein by reference.

FIELD OF THE INVENTION

The invention relates to the field of rotary bearings of the ball bearing type and more particularly that of seals with which such ball bearings are equipped.

BACKGROUND OF THE INVENTION

Bearings can be used in multiple fields of application in order to provide a mechanical connection of the "swivel" or "pivot" type between two parts. Such ball bearings are generally made up of an inner race intended to be secured to a first part, and an outer race intended to be secured to a second part. The inner race and the outer race both define a rolling space in which one or more rows of balls are disposed. The balls are generally kept spaced apart circumferentially by a cage comprising a plurality of cells that each form a space for one of the balls. The cage can be produced by molding a synthetic material.

In order to improve the rolling quality and in particular to reduce friction, provision can be made for the dimensions of the cage to be reduced as much as possible. For example, a cage made of a wire can be provided.

In the majority of ball bearings, two seals for preventing the leakage of a lubricant introduced into the rolling space in order to reduce friction are also provided. The seals are also intended to prevent the introduction of external elements, such as dust, into the rolling space.

A problem that is frequently encountered in the mounting of each seal is that of fastening it to the bearing.

The invention aims to remedy this drawback.

BRIEF SUMMARY OF THE INVENTION

More particularly, the invention aims to provide a ball bearing equipped with at least one seal that can be installed easily and securely on the bearing, while ensuring good sealing and creating minimal bulk.

To this end, a ball bearing comprising an inner race, an outer race, at least one row of balls and at least one cage for spacing apart the row of balls and provided with a wire extending inside a rolling space delimited by the outer race and the inner race is proposed.

According to one of its general features, the bearing also comprises at least one seal comprising coupling means for fastening to the wire of the cage.

Such a bearing is particularly advantageous in that the seal can be installed simply and reliably on a cage with very little bulk.

Advantageously, the seal is accommodated entirely inside the rolling space. Thus, the overall bulk of the bearing is not changed by the presence of the seal. Alternatively, it may be possible to provide a seal that is fastened to the wire of the cage and rubs against the front surfaces of the inner and outer races. However, such a variant changes the overall bulk of the bearing.

Preferably, the coupling means of the seal are fastened removably to the wire of the cage.

In one embodiment, the inner race comprises at least one groove formed on an outer surface of the race, and the outer race comprises at least one groove formed in the bore of the race, the seal being mounted so as to press axially against the grooves.

Provision can also be made for the seal to comprise at least one outer sealing lip and at least one inner sealing lip that cooperate with the outer race and inner race, respectively.

Advantageously, the outer sealing lip and inner sealing lip are mounted so as to press axially against the grooves of the inner race and outer race.

Provision can also be made for the seal to comprise an insert made of a rigid material and a sealing gasket made of a flexible material, the insert comprising the coupling means.

According to one embodiment, the wire comprises at least one group of heels that are spaced apart from one another in the circumferential direction and form a discontinuous ring, the coupling means of the seal being fastened to at least one of the heels of the group of heels.

In one embodiment, the wire comprises a first group of heels that are spaced apart from one another in the circumferential direction and form a first discontinuous ring, a second group of heels that are spaced apart from one another in the circumferential direction and form a second discontinuous ring, and a plurality of connecting portions that each extend between one of the heels of the first group and one of the heels of the second group, the connecting portions and the heels of the first group and/or the heels of the second group delimiting a plurality of spaces that each comprise a ball, the cage also comprising at least one interposed part that is disposed inside each space and is provided with a body for accommodating the ball contained in the space, the body being coupled to at least one of the connecting portions of the wire delimiting the space.

It is thus possible to provide a first seal that comprises coupling means for fastening to at least one of the heels of the first group, and a second seal that comprises coupling means for fastening to at least one of the heels of the second group.

BRIEF DESCRIPTION OF THE SEVERAL VIEWS OF THE DRAWING

Further aims, features and advantages of the invention will become apparent from reading the following description, which is given purely by way of non-limiting example and with reference to the appended drawings, in which.

DETAILED DESCRIPTION OF THE INVENTION

Figure 1:
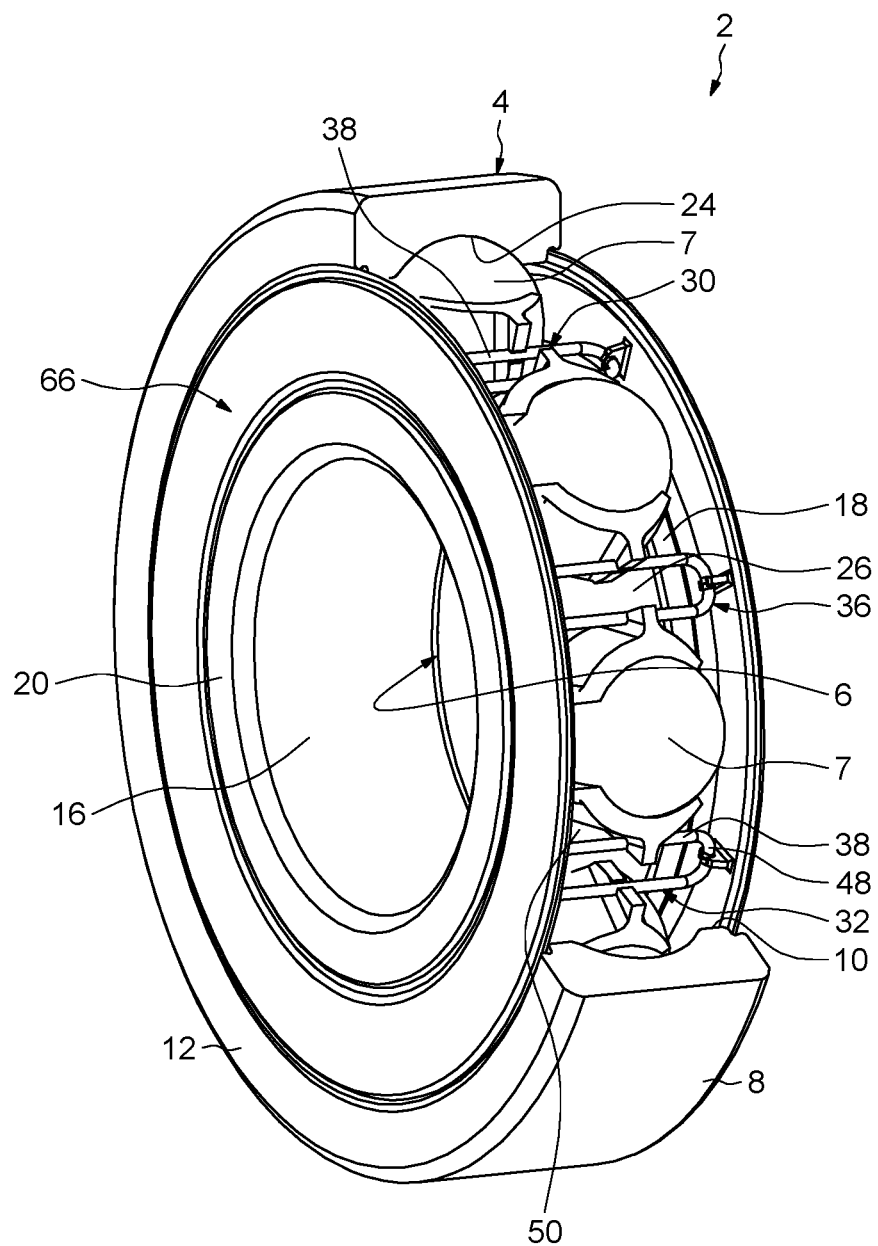
FIG. 1 illustrates a perspective view of a ball bearing according to one exemplary embodiment of the invention.
Figure 2:
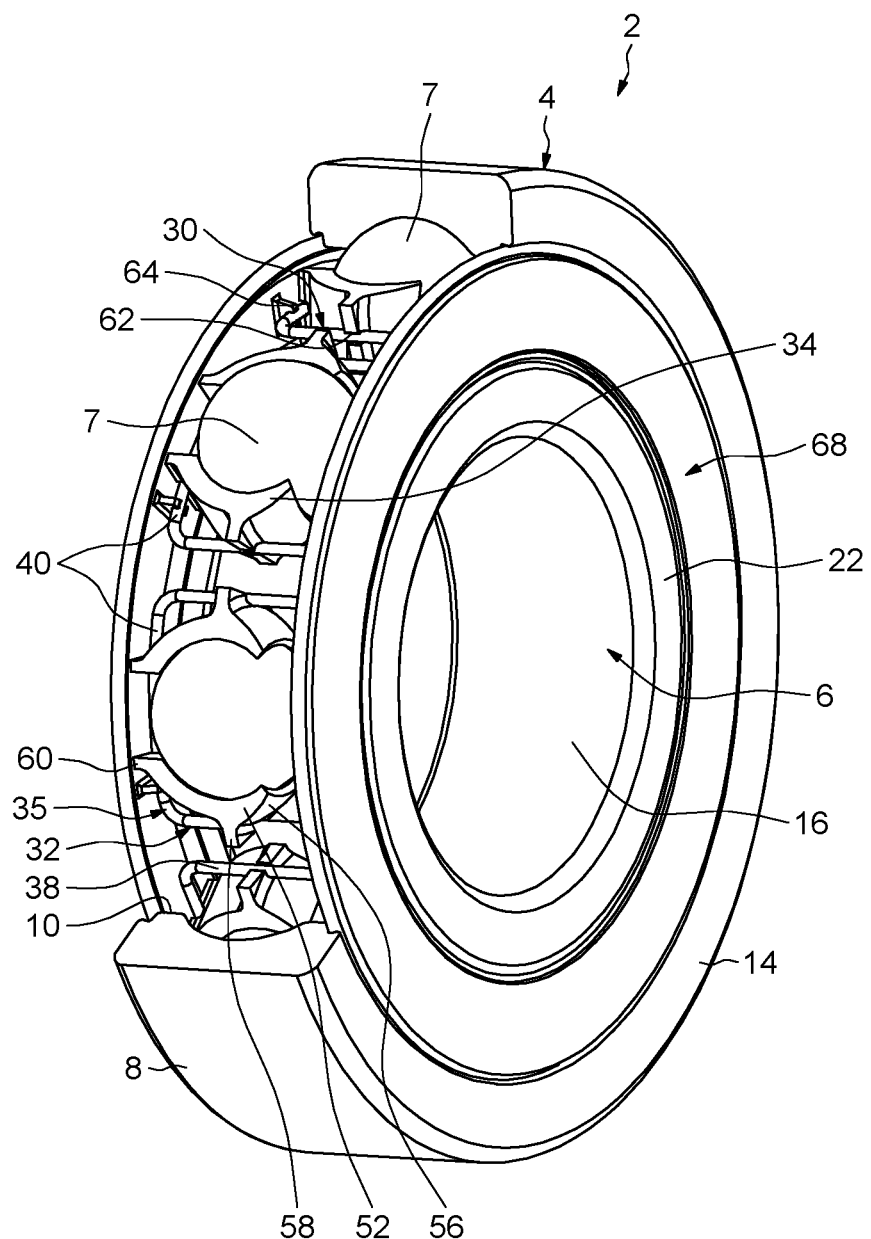
FIG. 2 illustrates another perspective view of the bearing in FIG. 1.

With reference to FIGS. 1 and 2, the ball bearing 2 comprises an outer race 4 (illustrated partially), an inner race 6 and a row of balls 7 interposed between the races 4 and 6. The outer race 4 and the inner race 6 are both cylindrical and disposed coaxially with respect to one another. For the present description, unless stated otherwise, an axial direction and a radial direction are defined relatively with respect to the axis of the ball bearing 2.

The outer race 4 comprises a cylindrical outer surface 8, a cylindrical bore 10 situated radially away from the outer surface 8, and two opposite radial front surfaces 12 and 14 that axially delimit the outer surface 8 and the bore 10. In the same way, the inner race 6 comprises a cylindrical bore 16, a cylindrical outer surface 18 (FIG. 1) situated radially away from the bore 16, and two opposite radial front surfaces 20 and 22 which axially delimit the bore 16 and the outer surface 18. A rolling space 23, within which the balls 7 are inserted, is radially delimited by the bore 10 and the outer surface 18 of the outer and inner races. The rolling space 23 is axially delimited on one side by the front surfaces 12, 20 and on the other side by the front surfaces 14, 22 of the races. Tracks 24, 26 (FIG. 3) are made in the races 4 and 6, respectively, to form raceways for the balls 7.

The bearing 2 also comprises a cage 30 for maintaining the circumferential spacing of the balls 7. The cage 30 is disposed inside the rolling space 23. The function of the cage 30 is to define a housing for each of the balls 7 of the bearing 2 and to keep the balls 7 inside their respective housings. To this end, the cage 30 has in particular a wire 32 and a plurality of interposed parts 34 (FIG. 2).

Still with reference to FIGS. 1 and 2, the wire 32 is closed. The wire 32 forms a first discontinuous ring 35 (FIG. 2), a second discontinuous ring 36 (FIG. 1) and a plurality of connecting portions 38 extending between the discontinuous rings 35 and 36. The discontinuous rings 35 and 36 are parallel to one another and perpendicular to the axial direction of the bearing 2. The connecting portions 38 extend substantially in the axial direction of the bearing 2, that is to say perpendicularly to the plane of the rings 35 and 36. By virtue of the sinuous shape of the wire 32, a plurality of spaces 50 containing the balls 7 are defined. The balls 7 are kept spaced apart from one another by the interposed parts 34 (FIG. 2). More specifically, it should be noted that there is no contact between the wire 32 of the cage and the balls 7. By avoiding contact between the wire 32 and the balls 7, the contact between the balls 7 and the cage 30 passes entirely via the interposed parts 34. This makes it possible to minimize the friction due to the sliding of the balls against the cage, through an appropriate choice of the material and the shape of the interposed parts.

Although the wire 32 is made in one piece in the exemplary embodiment illustrated, it is possible to envisage a wire made up of several parts that are joined together, without departing from the scope of the invention.

The interposed parts 34 are shaped so as to be secured to the wire 32 by virtue of coupling means that are designed to allow the interposed parts 34 to pivot about the connecting portions 38. This results in greater flexibility of the cage 30 under the pressure exerted by the balls 7 and thus in an additional reduction in friction. Moreover, fitting and removal are rendered easier.

The first discontinuous ring 35 is substantially in the shape of a regular polygon, each of the sides thereof being disposed opposite a ball 7 of the bearing 2. Since the present exemplary embodiment relates to a ball bearing comprising eight balls, the first discontinuous ring 35 is substantially in the shape of a regular octagon. The first discontinuous ring 35 is made up of a first group of heels 40 (FIG. 2). The first group of heels advantageously comprises as many heels 40 as there are balls 7 in the row of balls. Thus, in the exemplary embodiment illustrated, the first group of heels comprises eight heels 40. The heels 40 are spaced apart from one another in the circumferential direction. The heels 40 are made up of portions of the wire 32 that are substantially straight, perpendicular to the axial direction, substantially equal in length and all extend substantially in one and the same plane. Each heel 40 has a first end (not referenced) and a separate second end (not referenced) away from the first end. The length of the heels 40 is greater than the diameter of one ball 7 intended to cooperate with the cage 30 and preferably less than this diameter multiplied by a factor of 1.5.

The connecting portions 38 each extend from a first or a second end of a heel 40. More particularly, for each heel 40, of exactly two connecting portions 38, one extends from the first end and the other from the second end. Thus, in the exemplary embodiment shown, the cage 30 has sixteen connecting portions 38. Each of the connecting portions 38 extends generally in the axial direction and is thus generally orthogonal to the plane defined by the heels 40. Moreover, the connecting portions 38 all extend in the same direction from the plane defined by the heels 40 and have substantially identical shapes and dimensions. Each connecting portion 38 comprises a rectilinear part (not referenced) that is directed substantially in the direction orthogonal to the plane defined by the heels 40. As a corollary, the rectilinear part of each connecting portion 38 is substantially perpendicular to the heel 40 adjacent to the connecting portion 38. The respective rectilinear parts of the connecting portions 38 are substantially the same length, namely between half and three quarters of the diameter of a ball 7 intended to cooperate with the cage 30. Each connecting portion 38 also comprises a curved part (not referenced) that connects in each case the rectilinear part of the connecting portion 38 to one of the ends of the associated heel 40.

The second discontinuous ring 36 is made up of a second group of heels 48 (FIG. 1) that are spaced apart from one another in the circumferential direction. In the exemplary embodiment illustrated, the second group of heels comprises eight heels 48 that serve to connect the connecting portions 38 in pairs. More particularly, each heel 48 connects for the one part a connecting portion 38 extending from one end of a first heel 40 and for the other part a connecting portion 38 extending from one end of a second heel 40, separate from the first heel, the first and second heels 40 of the first group being two adjacent sides of the polygonal discontinuous ring 35.

Each of the heels 40 of the first group delimits, with the two connecting portions 38 which extend from its ends, a space 50 (FIG. 1) inside which a ball 7 is disposed. Thus, each space 50 of the cage 30 is delimited by a heel 40 and the two connecting portions 38 that are adjacent thereto, respectively. In the exemplary embodiment which is illustrated, eight spaces 50 are thus each delimited by a heel 40 associated with the space 50 and by two connecting portions 38 associated with the space 50.

Each of the heels 48 of the second group delimits, with the two connecting portions 38 which extend from its ends, a space (not referenced) that can for example be filled with grease in order to reduce the friction of the cage 30 against the races 4 and 6 of the bearing 2.

With reference to FIGS. 1 and 2, the cage 30 has a plurality of pairs of interposed parts 34, each pair cooperating in each case with one of the balls 7 so as to keep it in position. In the exemplary embodiment shown, eight pairs of interposed parts 34 are fastened to the inside of the eight spaces 50, respectively, each pair of interposed parts 34 being applied to one of the eight balls 7, respectively. The interposed parts 34 can be made of a polymer material or of a metal material. The interposed parts 34 can be made by a molding, stamping or 3D printing method.

As can be seen in FIGS. 1 and 2, each space 50 comprises two interposed parts 34 that are generally disposed inside the space 50. In the exemplary embodiment illustrated, the interposed parts 34 of the cage 30 are all identical to one another. Alternatively, without departing from the invention, it is conceivable for the interposed parts 34 of each pair mounted inside the space 50 to have a different design from one another.

Each interposed part 34 comprises a body 52 (FIG. 2) in contact with the ball 7 of the associated space 50. To this end, the body 52 comprises a concave inner surface (not shown) that follows the spherical shape of the ball 7. Conversely, the body 52 comprises a convex outer surface 56. The body 52 of each interposed part 34 is situated entirely inside the associated space 50. In other words, the body 52 is situated entirely in the circumferential direction between the two connecting portions 38 that delimit the space 50. Moreover, the body 52 is situated entirely on one side of the heel 40 delimiting the space 50.

Figure 3:
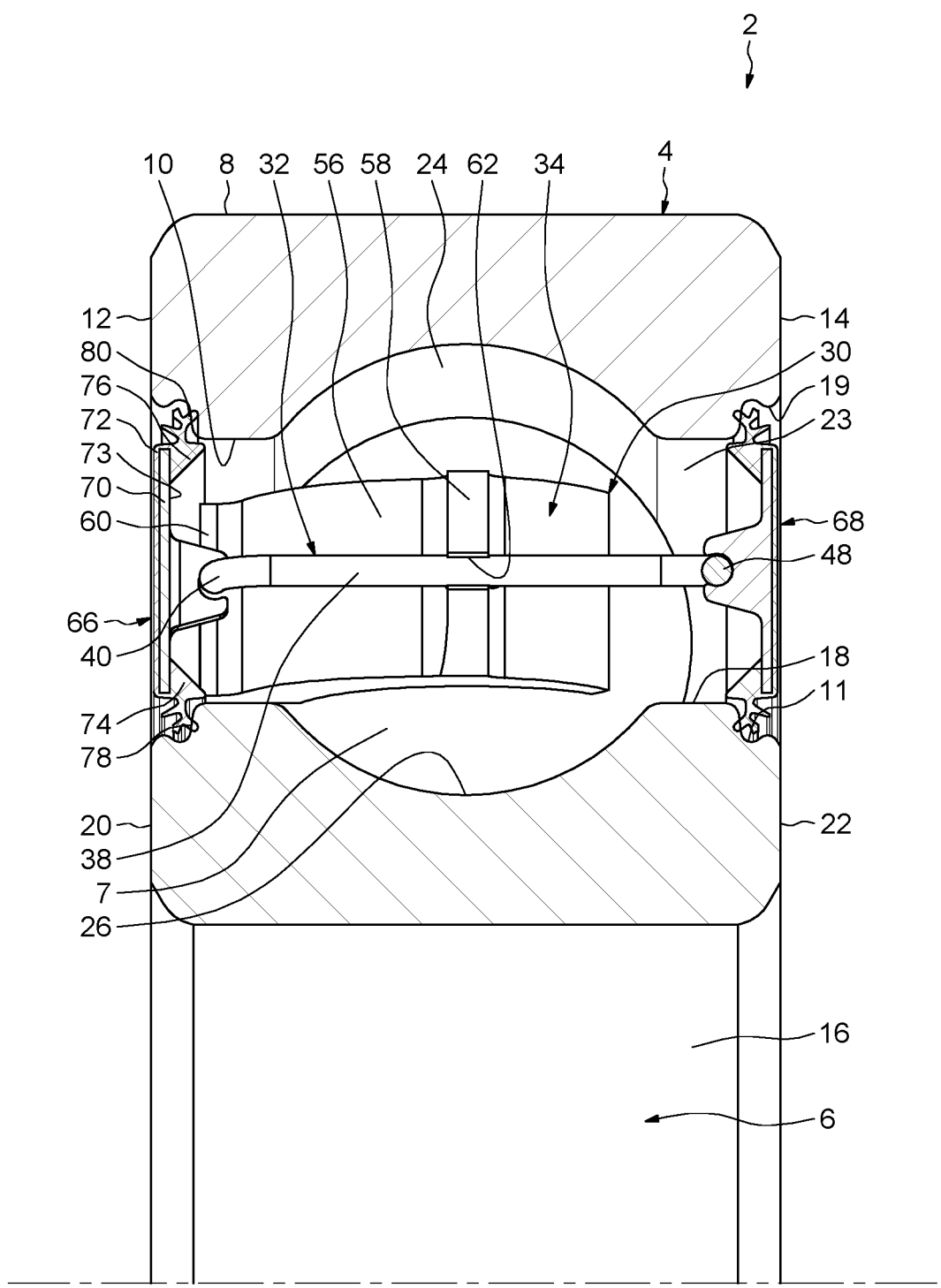
FIG. 3 is a half view in section of the bearing in FIGS. 1 and 2.

The body 52 of each interposed part 34 also comprises coupling means for coupling the interposed part to the wire 32. For each interposed part 34, the coupling means comprise a first rib 58 and a second rib 60. The ribs 58 and 60 both extend from the outer surface 56 of the body 52. More particularly, the rib 58 extends substantially in the plane perpendicular to the axial direction of the bearing 2. The rib 60 extends in the plane perpendicular to the direction of the heel 40 delimiting the associated space 50. The rib 58 comprises an end (not referenced) away from the outer surface 56 of the body 52. In the same way, the rib 60 comprises an end (not referenced) away from the outer surface 56. The rib 58 comprises a groove 62 (FIGS. 2 and 3). Similarly, the rib 60 comprises a groove 64 (FIG. 2). Each groove 62, 64 is made at the respective end away from the outer surface 56 of the associated rib 58, 60. For each interposed part 34, the groove 62 in the rib 58 is provided for the passage of and for retaining a connecting portion 38 delimiting the associated space 50. The groove 64 is provided for the passage of and for retaining the heel 40 delimiting the associated space 50.

With reference now to FIGS. 2 and 3, a ball 7 is thus in spherical contact with the inner surfaces of two interposed parts 34 associated therewith, the inner surfaces retaining the ball 7. On the other side, the interposed parts 34 are both in surface contact via the grooves 62 and 64 with the portions of the wire 32.

Considering one of the two interposed parts 34, the combination of the spherical contact and the surface contact makes it possible to keep the interposed part in position with respect to the wire 32 when a ball 7 is fitted correctly. By contrast, the interposed part 34 can be moved easily with respect to the wire 32 when the ball 7 has not been fitted.

Consequently, a unit assembly made up of a first interposed part 34, the ball 7 and a second interposed part 34 is secured to the wire 32 and held immovably inside the space 50. The cage 30 thus maintains the circumferential space between the balls 7 of the ball bearing 2.

Furthermore, the bearing 2 also comprises a first seal 66 (FIGS. 1 and 3) and a second seal 68 (FIGS. 2 and 3) that are situated axially on either side of the row of balls 7 and inside the rolling space 23. The seals 66, 68 are accommodated entirely inside the rolling space 23 and fastened to the cage 30 as will be described in more detail in the following text. The seals 66, 68 do not protrude from the front surfaces of the outer race 4 and inner race 6. Since the seals 66, 68 are identical here, only one of them will be described.

Figure 4:
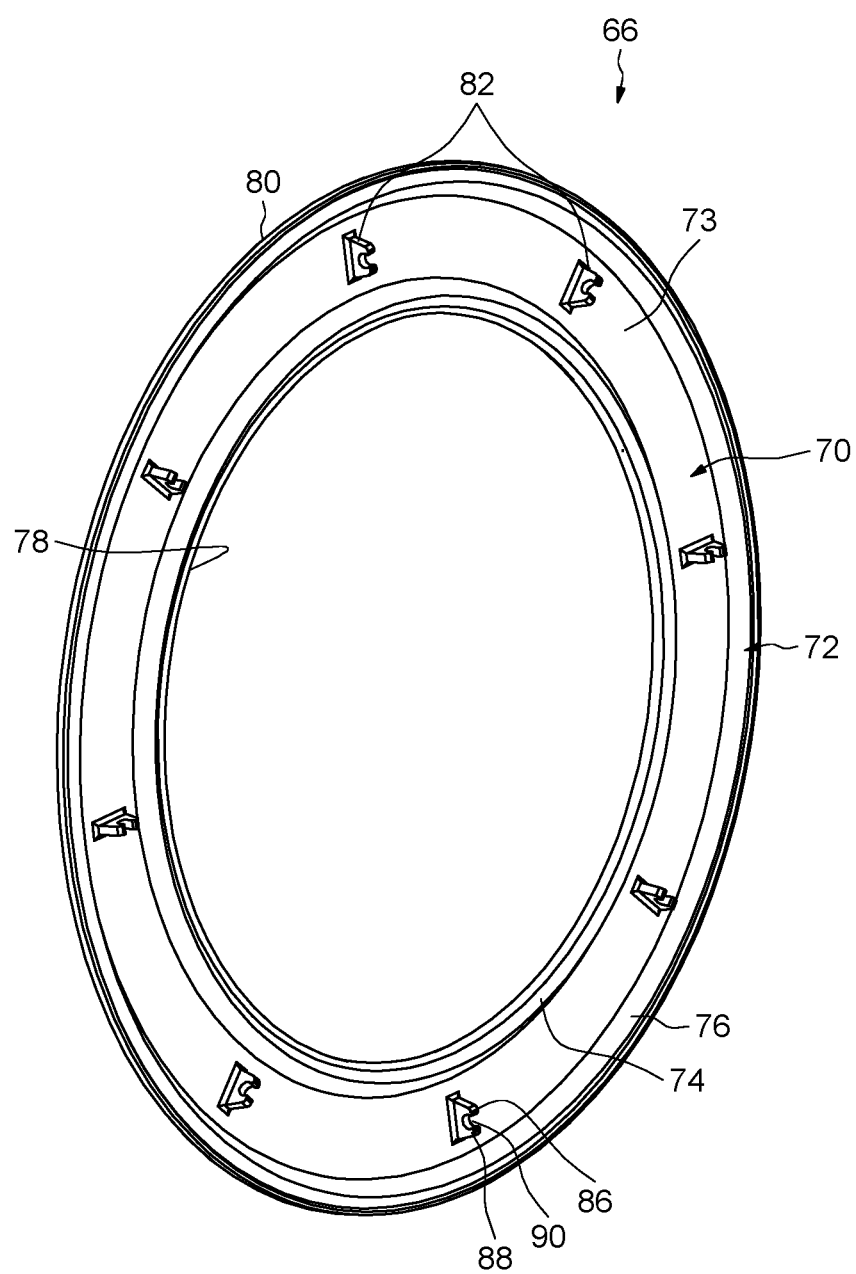
FIG. 4 illustrates a perspective view of one of the seals of the bearing in FIGS. 1 to 3.

As is shown notably in FIGS. 3 and 4, the seal 66 comprises an insert 70 on which there is disposed a sealing gasket 72 that is made of a flexible material and forms a dynamic seal with the outer race 4 and inner race 6. A "dynamic seal" is understood as meaning a seal between two parts exhibiting relative motion.

As can be seen in FIG. 3, two symmetrical grooves 19, are made in the bore 10 of the outer race 4, in the vicinity of the radial front surfaces 12 and 14, respectively. In the same way, two symmetrical grooves 19 (only one referenced) are made in the surface of the outer surface 18 of the inner race 6, in the vicinity of the radial front surfaces 20 and 22, respectively. Each groove 11 in the inner race is respectively opposite a groove 19 in the outer race. The groove 11 and the opposite groove 19 allow one of the seals 66, 68 to be fitted inside the bearing.

The insert 70 is made of a rigid material, for example by stamping, cutting and bending a sheet or a tube of steel. Alternatively, the insert 70 can be made of rigid plastics material, for example of polyamide. The insert 70, which has an annular overall shape, extends radially.

The gasket 72 can be made of elastomer, for example such as rubber or nitrile rubber. The sealing gasket 72 is overmolded or vulcanized on the flange 70. Alternatively, the insert 70 can be stamped from the material of which the gasket 72 is made. The sealing gasket 72 comprises an annular radial inner heel 74 and an annular radial outer heel 76. An annular sealing lip 78 protrudes from the heel 74 on the inner side of the bearing 2. Conversely, an annular sealing lip 80 protrudes from the heel 76 on the outer side of the bearing 2. The heels 74 and 76 cover the small and large diameter edges of the insert 70, respectively. The lips 78, 80 fulfil the function of a dynamic seal with the inner race 6 and outer race 4, respectively.

The inner lip 78 of the seal 66 is oriented axially inwards and comes into frictional contact with the groove 19 in the inner race 6. The lip 78 is flexible both in the radial direction and the axial direction. The frictional contact between the lip 78 and the groove 19 is mainly axial.

Conversely, the outer lip 80 is oriented axially inwards and comes into frictional contact with the groove 11 in the outer race 4. The lip 80 has a similar design to the lip 78 and is in particular flexible in the radial direction and the axial direction, such that the frictional contact between the lip 80 and the groove 11 is mainly axial. In this way, the sealing lips 78 and 80 are mounted so as to press axially against the respective grooves 19, 11 in the inner and outer races, such that the seal 66 is mounted so as to press axially against the grooves.

In the exemplary embodiment illustrated, above each lip 78, 80, two separate additional lips (not referenced) extend axially outwards. These additional lips serve in particular to avoid the introduction of external particles such as dust into the rolling space 23. Without departing from the scope of the invention, it is conceivable to modify the disposition of the internal and external sealing lips.

With reference now to FIG. 4, the insert 70 comprises an external front surface covered with the gasket 72 and an opposite internal front surface 73 which is oriented axially towards the balls 7. The insert 70 also comprises a plurality of coupling means 82 for fastening to the cage 30. The coupling means 82 extend from the axial surface 73 towards the inside of the bearing.

The insert 70 preferably has as many coupling means 82 as the wire 32 comprises heels 40 of the first group.

Alternatively, the insert 70 can have a different number of coupling means 82, it being equally possible for the number to be greater or smaller than the number of heels 40 of the first group. In the case of a greater number of coupling means 82, fastening will be more reliable. In the opposite case, the assembly and production of the insert 70 are rendered easier. Moreover, the coupling means 82 are distributed in the circumferential direction so as to be fastened to each of the heels 40 of the first group. To this end, the insert 70 has eight coupling means 82 distributed regularly in the circumferential direction.

Each of the coupling means 82 comprises a first lug 86 and a second lug 88 which extend from the front surface 73 and which are oriented and spaced apart from one another in the radial direction of the bearing 2. In this way, a space 90 for receiving and retaining a portion of the wire 32 is defined. More particularly, the space 90 is shaped so as to receive and retain a heel 40 of the first group. To this end, the lugs 86 and 88 are dimensioned so as to allow flexion of the lugs 86 and 88 during the introduction of a heel 40 into the space 90. The tabs 86 and 88 then exert a force on the heel 40 such that an adhesion force arises, allowing the retention of the heel 40.

By providing coupling means 82 that are regularly spaced in the circumferential direction and are each provided with two flexible lugs that are oriented and spaced apart from one another in the radial direction of the bearing 2, the insert 70 can be fitted on the first group of heels 40 of the wire 32 easily and securely. It is also possible to disassemble the assembly produced easily, for example for maintenance of the bearing 2. The seal 66 can thus be fastened to the bearing 2 easily, reliably and removably.

By providing similar coupling means on the insert of the seal 68, the insert can be fitted on the second group of heels 48 of the wire 32 just as easily and reliably. In the embodiment illustrated, the heels 40 and 48 of the wire 32 advantageously have the same thickness. In this way, the coupling means can be identical for the seal 66 and for the seal 68. The seals 66 and 68 can thus be more or less identical and can thus very easily be inverted.

In the exemplary embodiment illustrated, the sealing lips 76 and 78 of the seal are rubbing lips. Alternatively, at least one of these lips could be of the labyrinth type, i.e. forming a seal with the associated race by narrow passage(s).

In the exemplary embodiment illustrated, all the balls 7 are contained in a space 50 delimited by a heel 40 of the first group and the two associated connecting portions 38. Alternatively, it would be possible to provide heels 48 of the second group that have a larger circumferential dimension, for example substantially equal to that of the heels 40 of the first group. In this way, the spaces delimited by the heels 48 of the second group and by the two associated connecting portions 38 are able to receive balls 7. In such an alternative exemplary embodiment, the cage then comprises two groups of spaces that are intended to receive balls, the first group being made up of spaces 50 which are closed by a heel 40 at the first ring 35 and are open at the second ring 36, the second group being made up of complementary spaces delimited by the heels 48 of the second group, which are closed by the heels 48 at the second ring 36 and are open at the first ring 35. In such an alternative embodiment, the balls 7 are thus introduced into the spaces of the first group from the side of the second ring 36 and the balls 7 are introduced into the spaces of the second group from the side of the first ring 35.

In the exemplary embodiment illustrated, the sealing lips of the seal extend from the heel of the sealing gasket. Alternatively, these lips could extend directly from the insert, being for example overmolded on the insert, the insert comprising the coupling means of the seal.

In the exemplary embodiment illustrated, the seal comprises two parts, namely a reinforcing insert and a sealing gasket fastened to this insert, the insert comprising the coupling means for coupling the seal to the cage. Alternatively, it may be possible to provide a seal in which the sealing gasket comprises the coupling means. In another variant, the seal can comprise a single part, namely the insert or the sealing gasket.

The invention makes it possible to install a seal on a ball bearing easily and reliably, while allowing easy disassembly thereof and creating limited bulk. Installation is rendered particularly easy in the case of a bearing comprising a cage with little bulk, such as a cage provided with a wire.

The invention claimed is:
1. A ball bearing comprising:
an inner race,
an outer race,
at least one row of balls, and
a cage for spacing apart the row of balls and provided with a wire extending inside a rolling space delimited by the outer race and the inner race,
at least one seal comprising coupling means for fastening to the wire of the cage, wherein the cage defines a plurality of pockets each of which comprises:
a portion of the wire forming a U-shape configured to support a first interposed part and a second interposed part and one ball of the plurality of balls therein,
wherein the U-shape formed by the wire includes a heel segment having a first heel segment end and a second heel segment end, the heel segment extends in a direction perpendicular to an axial direction of the ball bearing,
the U-shape formed by the wire further including two connecting portions, each extending from a separate one of the first and second heel segment ends,
the first and second interposed parts each pivotally attached to a separate one of the two connecting portions such that the first and second interposed parts are configured to pivot depending on contact with the one ball;
wherein each ball of the plurality of balls in the cage is adjacent to first and second interposed parts that each independently pivot based on contact therewith; and
wherein the seal is accommodated entirely inside the rolling space.
2. The bearing according to claim 1, wherein the coupling means of the seal are fastened to the wire of the cage and are removable.
3. The bearing according to claim 1, wherein the seal comprises at least one outer sealing lip and at least one inner sealing lip that cooperate with the outer race and inner race, respectively.
4. The bearing according to claim 1, wherein the wire comprises at least one group of heels that are spaced apart from one another in the circumferential direction and form a discontinuous ring, the coupling means of the seal being fastened to at least one of the heels of the group of heels.
5. A ball bearing comprising:
an inner race,
an outer race,
at least one row of balls, and a cage for spacing apart the row of balls and provided with a wire extending inside a rolling space delimited by the outer race and the inner race, at least one seal comprising coupling means for fastening to the wire of the cage, wherein the cage defines a plurality of pockets each of which comprises:

a portion of the wire forming a U-shape configured to support a first interposed part and a second interposed part and one ball of the plurality of balls therein, wherein the U-shape formed by the wire includes a heel segment having a first heel segment end and a second heel segment end, the heel segment extends in a direction perpendicular to an axial direction of the ball bearing, the U-shape formed by the wire further including two connecting portions, each extending from a separate one of the first and second heel segment ends, the first and second interposed parts each pivotally attached to a separate one of the two connecting portions such that the first and second interposed parts are configured to pivot depending on contact with the one ball;

wherein each ball of the plurality of balls in the cage is adjacent to first and second interposed parts that each independently pivot based on contact therewith; and wherein the inner race comprises at least one groove formed on an outer surface of the race, and the outer race comprises at least one groove formed in the bore of the race, the seal being mounted so as to press axially against the grooves.

6. The bearing according to claim 5, wherein the seal comprises at least one outer sealing lip and at least one inner sealing lip that cooperate with the outer race and inner race, respectively, and wherein the outer sealing lip and inner sealing lip are mounted so as to press axially against the grooves of the inner race and outer race.

7. A ball bearing comprising:

an inner race, an outer race, at least one row of balls, and a cage for spacing apart the row of balls and provided with a wire extending inside a rolling space delimited by the outer race and the inner race, at least one seal comprising coupling means for fastening to the wire of the cage, wherein the cage defines a plurality of pockets each of which comprises:

a portion of the wire forming a U-shape configured to support a first interposed part and a second interposed part and one ball of the plurality of balls therein, wherein the U-shape formed by the wire includes a heel segment having a first heel segment end and a second heel segment end, the heel segment extends in a direction perpendicular to an axial direction of the ball bearing, the U-shape formed by the wire further including two connecting portions, each extending from a separate one of the first and second heel segment ends, the first and second interposed parts each pivotally attached to a separate one of the two connecting portions such that the first and second interposed parts are configured to pivot depending on contact with the one ball;

wherein each ball of the plurality of balls in the cage is adjacent to first and second interposed parts that each independently pivot based on contact therewith; and wherein the seal comprises an insert and a sealing gasket, the insert providing the coupling means.

* * * * *